(No Model.)
W. A. GOODYEAR & L. KETCHUM.
DEVICE FOR REGULATING THE FEED AND DISCHARGE OF LIQUIDS.
No. 356,831. Patented Feb. 1, 1887.
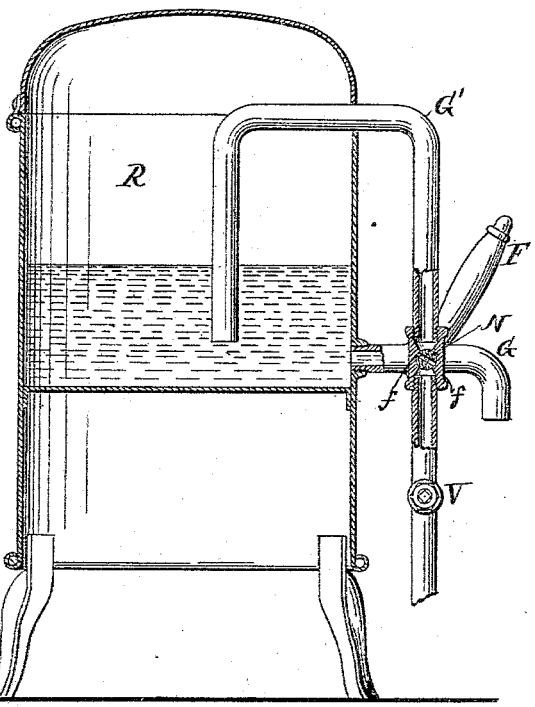
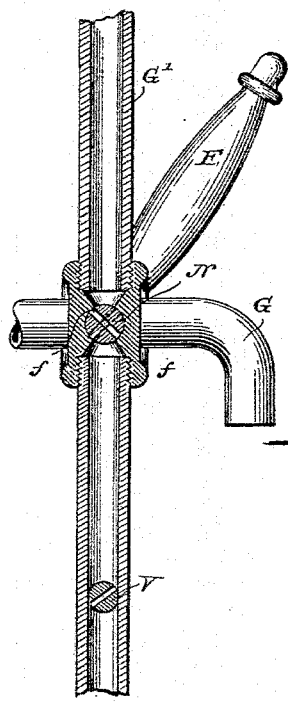
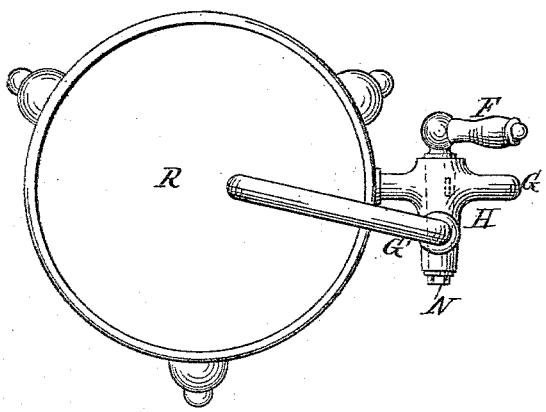
Witnesses:
Geo. W. Miatt
Wm. Gardner
Inventors:
Watson A. Goodyear and
Landon Ketchum
By their Attorney,
Millard Parker Butler

UNITED STATES PATENT OFFICE.

WATSON A. GOODYEAR, OF NEW HAVEN, AND LANDON KETCHUM, OF SAUGATUCK, CONNECTICUT.

DEVICE FOR REGULATING THE FEED AND DISCHARGE OF LIQUIDS.

SPECIFICATION forming part of Letters Patent No. 356,831, dated February 1, 1887.

Application filed February 6, 1886. Serial No. 191,054. (No model.)

*To all whom it may concern:*

Be it known that we, WATSON A. GOODYEAR and LANDON KETCHUM, both citizens of the United States, and residents, the former of New Haven, in the county of New Haven and State of Connecticut, and the latter of Saugatuck, in the county of Fairfield and State of Connecticut, have invented certain new and useful Improvements in Devices for Regulating the Feed and Discharge of Liquids in Heating or Cooling Vessels, of which the following is a specification.

Our invention relates to an improved form of device for automatically feeding and discharging any form of open vessel through which a constant stream of liquid is desired to be passed without danger of overflowing; and by means thereof it is possible to regulate the supply and discharge of vessels of all sizes to variable pressures of liquid in the supply-pipe. Our invention is, however, primarily applicable to all forms of apparatus for heating or cooling water for domestic purposes, and more especially to the various forms of water-heaters invented by us for which Letters Patent of the United States have heretofore been granted to us or for which we have applied for patents.

The invention will be best understood by reference to the accompanying sheet of drawings, in which—

Figure 1 is a vertical cross-section of the device attached to an ordinary cylindrical heating or cooling vessel; Fig. 2, a plan view of the same, and Fig. 3 a sectional detail showing the supply and discharge cocks and check-valve.

Similar letters refer to similar parts throughout the several views.

In both Figs. 1 and 2, R represents a heating or cooling vessel of any desired form, which is or is not open on top, according to circumstances.

G represents the discharge-pipe at the bottom of the vessel, and G' the supply-pipe entering at or near the top.

The invention consists in so arranging the supply and discharge pipes in reference to each other that as much liquid is admitted to the vessel in a given period of time as is discharged therefrom in the same time, and in providing, in combination with the supply-pipe, a device for reducing the ordinary pressure of the water in the pipes at the point where the apparatus is set up to such pressure as will cause a regular flow through the same. This is accomplished, as shown in the drawings, by arranging the supply-pipe G', which leads from the usual supply-pipe, in such a manner that it shall pass in close proximity to the discharge-pipe G, and by placing between the pipes and in both pipes a double discharge and supply cock, H, composed of valves having water-passages of equal dimensions, arranged to turn upon the same horizontal spindle, N.

*f f* represent the valve-seats in the spindle, and are of the shape there shown.

Fig. 1 shows the valve in the supply-pipe G' in vertical cross-section, and Fig. 2 the arrangement of the two pipes G and G'.

F is an ordinary handle, by means of which the cock H is turned.

In many cases the inward pressure of the liquid is so strong that more water would enter through the valve in the supply-pipe than can be discharged through G, and there is danger of the vessel overflowing. To obviate this difficulty a regulating or check valve, V, of any convenient character, such as is ordinarily used in water-pipes, is inserted in the supply-pipe G', for retarding the flow of the water in the pipe. This check-valve may be set by means of a wrench or turning-screw or by any other convenient form of device.

The method of operating the device is substantially as follows: When the apparatus is first set up, both inlet and outlet valves are opened to their full extent by turning the handle F so that it shall be parallel with the discharge-pipe G. The check-valve is then opened by turning it, and the exact position ascertained at which, after having been set, it will allow a maximum amount of water to pass through the vessel R and the two valves without danger of overflow. The wrench or handle used for turning it may then be removed and the flow regulated by means of the handle F. The connection between the supply-pipe G' and the permanent supply-pipe may be made in any convenient manner, and the device may be constructed of any convenient material.

We claim as our invention—

In an apparatus for heating or cooling liquids, the combination, substantially as hereinbefore set forth, of the vessel R, the supply-pipe G', provided with the check-valve V, and the double supply and discharge cock H, whereby as much liquid is admitted to the vessel as is discharged therefrom in the same time.

Signed at the city and county of New Haven, in the State of Connecticut, this 28th day of January, 1886.

WATSON A. GOODYEAR.

Witnesses:
JOSEPH SHELDON,
EDWIN A. SMITH.

Signed at Westport, in the county of Fairfield and State of Connecticut, this 30th day of January, A. D. 1886.

LANDON KETCHUM.

Witnesses:
MARK L. HITLEY,
NORVEL STAPES.